W. C. SIMPSON, Jr. & J. P. BARBOUR.
SHOCK ABSORBER FOR PNEUMATIC TOOLS.
APPLICATION FILED APR. 12, 1916.
1,221,615.
Patented Apr. 3, 1917.
2 SHEETS—SHEET 1.
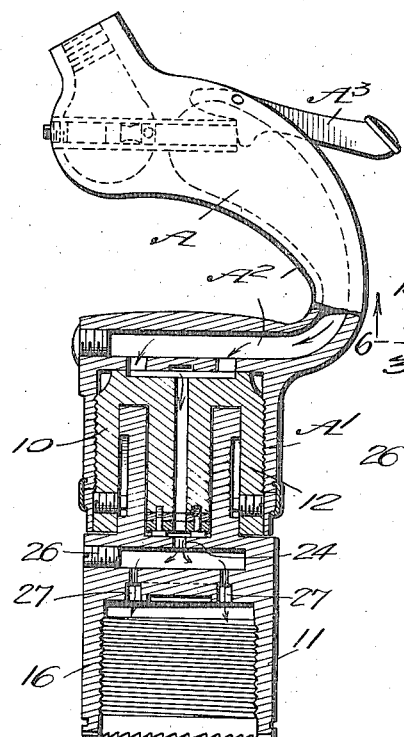
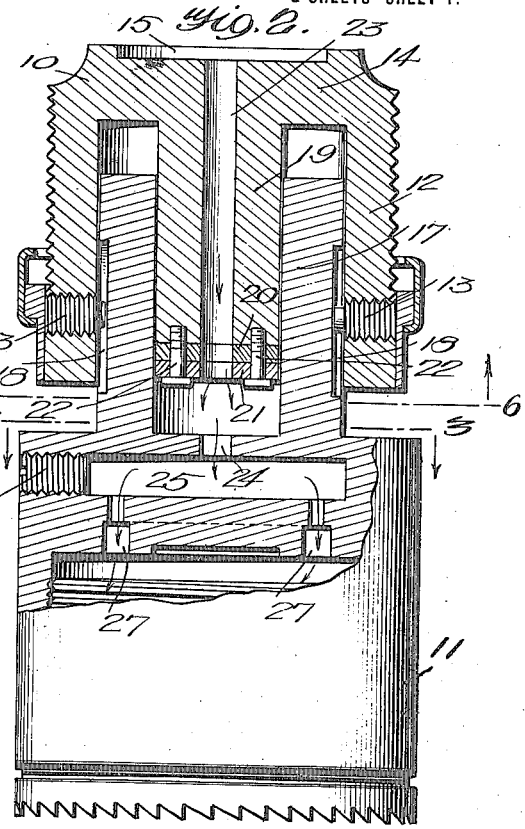
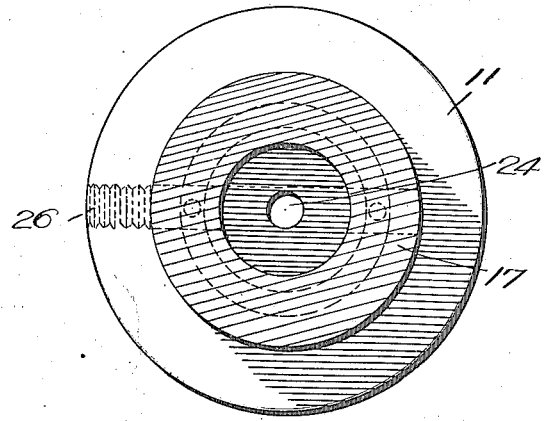
WITNESSES:
INVENTORS
WILLIAM C. SIMPSON JR,
JOHN P. BARBOUR,
BY
ATTORNEYS W. C. SIMPSON, Jr. & J. P. BARBOUR.
SHOCK ABSORBER FOR PNEUMATIC TOOLS.
APPLICATION FILED APR. 12, 1916.

1,221,615.

Patented Apr. 3, 1917.
2 SHEETS—SHEET 2.

WITNESSES:

INVENTORS
WILLIAM C. SIMPSON JR.,
JOHN P. BARBOUR,
BY
ATTORNEYS

UNITED STATES PATENT OFFICE.

WILLIAM CULROSS SIMPSON, JR., AND JOHN PORTER BARBOUR, OF LIVINGSTON, MONTANA.

SHOCK-ABSORBER FOR PNEUMATIC TOOLS.

1,221,615.  Specification of Letters Patent.  Patented Apr. 3, 1917.

Application filed April 12, 1916. Serial No. 90,781.

*To all whom it may concern:*

Be it known that we, WILLIAM CULROSS SIMPSON, Jr., and JOHN PORTER BARBOUR, citizens of the United States, and residents of Livingston, in the county of Park and State of Montana, have invented a certain new and useful Improvement in Shock-Absorbers for Pneumatic Tools, of which the following is a specification.

Our present invention relates generally to pneumatic tools, and more particularly to shock absorbers therefor, our primary object being to provide a shock absorbing device capable of connection with standard pneumatic tools for absorbing the shock of action of the tool to prevent transmission of the same to the operator thereof, the main consideration being the elimination of all shocks and jars to operators of such implements and the preservation of health.

Various other objects, with the advantages resulting therefrom, of our invention, relating for the most part to the particular features of construction and arrangement and operation thereof, will be better understood from the following description thereof, in which reference is made to the accompanying drawings forming a part of this specification, and in which—

Figure 1 is a view partly in side view and partly in vertical section, through a pneumatic hammer, the barrel of which is indicated in dotted lines, illustrating the practical disposition of our invention between the handle and the barrel.

Fig. 2 is a side view partly broken away and in section, of our invention removed from the handle.

Fig. 3 is a detail cross section taken substantially on line 3—3 of Fig. 2.

Figure 4:
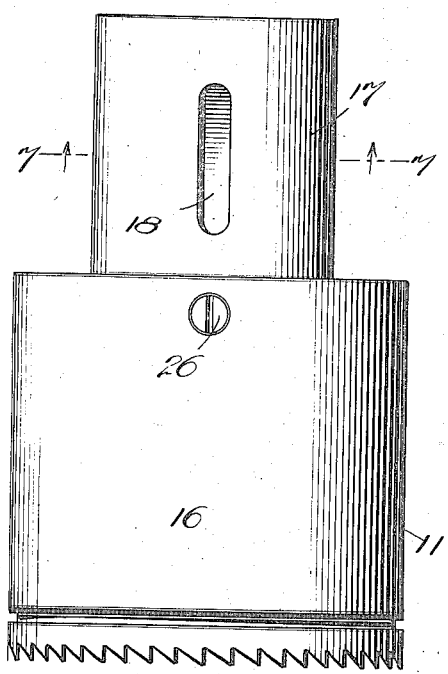
Fig. 4 is a side view of our improvement.
Figure 6:
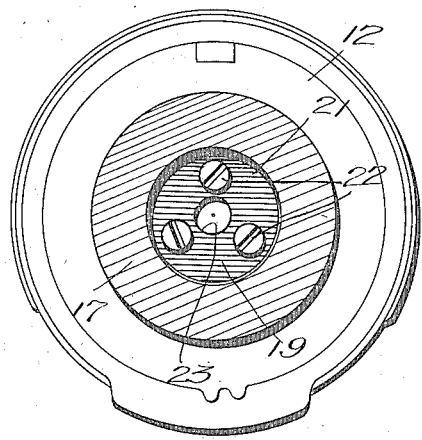
Fig. 6 is a detail cross section taken substantially on line 6—6 of Fig. 2.
Figure 5:
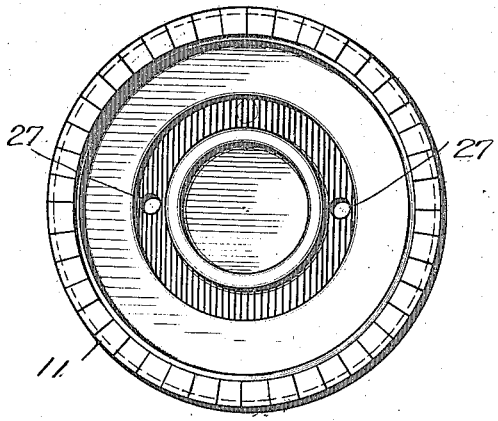
Fig. 5 is a bottom plan view thereof.
Figure 7:
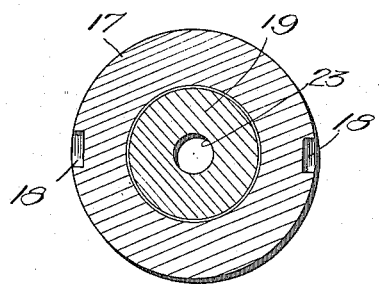
Fig. 7 is a similar view taken substantially on line 7—7 of Fig. 4.

Referring now to these figures, we have shown a standard pneumatic hammer in Fig. 1, including as usual, a handle portion A and a working barrel B, the latter of which is indicated in dotted lines and is, in the type illustrated, threaded at its upper end for engagement within the depending internally threaded sleeve A′ of the handle portion, the latter having an air channel $A^2$ controlled by a valve in turn actuated by the trigger $A^3$.

Our invention which is preferably interposed between the handle A and barrel B consists of relatively movable connecting members 10 and 11, the member 10 having an outer externally threaded annular wall 12 engageable within the sleeve A′ of the handle A and provided with diametrically opposed inwardly projecting set screws 13 adjacent its lower free edge, wall 12 being integral with the head 14 of the said connecting member, which latter has an annular cavity 15 in communication with the air channel $A^2$ of the handle A, as particularly seen in Fig. 1.

The other connecting member 11 has a depending internally threaded sleeve 16 receiving the upper threaded end of the barrel B and is provided at its upper end with a reduced cylinder 17 slidably interfitting the annular wall 12 of the member 10, said cylinder having longitudinal grooves 18 at diametrically opposite points of its outer surface into which the inner ends of the set screws 13 project to guide and limit the relative movement of the connecting members 10 and 11.

The upper end of the cylinder 17, projecting within the wall 12, is open for the reception of a piston 19 integral with the member 10 and projecting centrally and downwardly from its upper head 14 coaxial with respect to the annular wall 12 thereof, and slidably interfitting the bore of the cylinder 17, the lower inner end of said piston 19 being provided with a packing leather 20 and a follower plate 21, both held in connection therewith by machine screws 22, and having central openings therethrough in alinement with an axial air channel 23 through the piston 19, the upper end of which communicates with the air chamber 15, and the lower end of which communicates with the space between the inner ends of the piston and the lower inner end of the bore of the cylinder 17.

The lower inner end of the bore of the piston cylinder 17 is provided with an air port 24 therethrough, communicating with the bore of the cylinder and with a laterally extending air chamber 25, one end of which is closed by a plug 26, and which in turn communicates with the upper end of the barrel B through air ports 27.

Thus in operation the operating air passing from the handle A to the barrel B, is led through the registering air ports of two connecting members 10 and 11 and is in communication with a space between the inner end of the piston 19 and the inner end of the bore of the cylinder 17 so as to act as a cushion between the connecting members 10 and 11, which, in view of the adjustable movement of these connecting members with respect to one another under the influence of the air, absorbs the shocks in operation and prevents transmission of the same to the handle portion, as is ordinarily the case.

It is obvious that, for the purpose, we provide a simple, durable, and effective arrangement, and one which may be readily applied as an attachment in connection with all standard pneumatic tools, either by the threaded connection as shown, or by such other connections as may be adopted for the purpose.

We claim:—

1. In a pneumatic tool, the combination with a handle having a depending internally threaded sleeve, and a barrel externally threaded at its upper end, of a connecting member having an outer externally threaded wall engageable within the sleeve of the handle and provided with inwardly projecting radially disposed set screws; a second connecting member having a depending internally threaded sleeve to receive the upper end of the barrel and provided with an upper reduced cylinder slidably interfitting the wall of the first connecting member and having longitudinal grooves into which the inner ends of the said set screws project to guide and limit the relative movements of the connecting members, said first connecting member having a reduced piston slidably interfitting the cylinder of the second connecting member, and said connecting members having registering air ports communicating with the handle and with the barrel and also communicating with the space between the inner end of said piston and the inner end of the cylinder, all for the purpose described.

2. In a pneumatic tool, the combination with a handle having a depending internally threaded sleeve, and a barrel externally threaded at its upper end, of a connecting member having an outer externally threaded wall engageable within the sleeve of the handle, a second connecting member having a depending internally threaded sleeve to receive the upper end of the barrel, and provided with an upper reduced cylinder slidably interfitting the wall of the first connecting member, said first connecting member having a reduced piston slidably interfitting the cylinder of the said second connecting member, and said connecting members having registering air ports communicating with the handle and with the barrel and also communicating with the space between the inner end of said piston and the inner end of the cylinder, all for the purpose described.

3. In a pneumatic tool, the combination with a handle having a depending internally threaded sleeve, and a barrel externally threaded at its upper end, of a connecting member having an outer externally threaded wall engageable within the sleeve of the handle, a second connecting member having a depending internally threaded sleeve to receive the upper end of the barrel and provided with an upper reduced cylinder slidably interfitting the wall of the first connecting member, said first connecting member having a reduced piston slidably interfitting the cylinder of the said second connecting member, and said connecting members having registering air ports communicating with the handle and with the barrel and also communicating with the space between the inner end of said piston and the inner end of the cylinder, all for the purpose described, and means whereby to guide and limit the relative movement of the said connecting members.

4. In a pneumatic tool, the combination with a handle having a depending internally threaded sleeve, and a barrel externally threaded at its upper end, of a connecting member having an outer externally threaded wall engageable within the sleeve of the handle, a second connecting member having a depending internally threaded sleeve to receive the upper end of the barrel and provided with an upper reduced cylinder slidably interfitting the wall of the first connecting member, said first connecting member having a reduced piston slidably interfitting the cylinder of the said second connecting member, and said connecting members having registering air ports communicating with the handle and with the barrel and also communicating with the space between the inner end of said piston and the inner end of the cylinder, said ports of the first connecting member projecting axially through its said piston.

5. In a pneumatic tool, the combination with a handle, and an operating barrel, of a connecting member attached to the said handle and provided with diametrically opposed inwardly projecting guide members, a second connecting member attached to the said barrel and having an upper reduced cylinder slidably interfitting the first connecting member and having diametrically opposed longitudinal slots receiving the inner ends of said guide members, said first connecting member having a reduced piston slidably interfitting the cylinder of the second connecting member, and said connecting member having registering air ports communicating with the handle and with the barrel and also communicating with the space between the inner end of said piston and the inner end of said piston cylinder, all for the purpose described.

6. In a pneumatic tool, the combination with a handle, and an operating barrel, of a connecting member attached to the handle, a second connecting member attached to the barrel and having a cylinder projecting therefrom, said first connecting member having a reduced piston slidably interfitting the cylinder of the second connecting member, means for guiding and limiting relative movement of the said connecting member, and said connecting members having registering air ports communicating with the handle and with the barrel and also communicating with the space between the inner end of said piston and the inner end of the said piston cylinder, all for the purpose described.

WILLIAM CULROSS SIMPSON, Jr.
JOHN PORTER BARBOUR.

Witnesses:
  A. F. SPECKEEN,
  ANDREW SEABERG.